Oct. 9, 1951 L. FREIBERG 2,570,440

RADIO INTERFERENCE ELIMINATOR

Filed Oct. 1, 1949 4 Sheets-Sheet 1

INVENTOR.
LEO FREIBERG
BY [signature]

Oct. 9, 1951 L. FREIBERG 2,570,440

RADIO INTERFERENCE ELIMINATOR

Filed Oct. 1, 1949 4 Sheets-Sheet 2

INVENTOR.
LEO FREIBERG
BY

Oct. 9, 1951 L. FREIBERG 2,570,440

RADIO INTERFERENCE ELIMINATOR

Filed Oct. 1, 1949 4 Sheets-Sheet 3

INVENTOR.
LEO FREIBERG
BY

Oct. 9, 1951 L. FREIBERG 2,570,440

RADIO INTERFERENCE ELIMINATOR

Filed Oct. 1, 1949 4 Sheets-Sheet 4

INVENTOR.
LEO FREIBERG
BY

Patented Oct. 9, 1951 2,570,440

UNITED STATES PATENT OFFICE 2,570,440

RADIO INTERFERENCE ELIMINATOR

Leo Freiberg, Oakland, Calif., assignor to Friden Calculating Machine Co., Inc., a corporation of California Application October 1, 1949, Serial No. 119,111

6 Claims. (Cl. 171—97)

This invention relates to an improved method and means of eliminating electrical interference, and more particularly to a method and means of eliminating electrical interference injurious to the normal functioning of radio receiving equipment and the like and normally produced by electrical power units and the means operable to control the same.

It is an important object of this invention to provide a method and means of substantially eliminating electrical interference normally conducted and radiated away from electrical power units and the control circuit associated therewith.

It is another object of the invention to provide a method and means of substantially eliminating electrical interference generated by electrical power units and the control means therefor, which interference is otherwise transmitted to the external power supply system by either conduction or radiation.

It is still another object of the invention to provide a method and means of preventing the transmission of electrical interference generated by electric power units and the control means therefor either by radiation to adjacent metallic structures or by conduction to the associated power supply system in such a manner as to cause substantial interference with the normal functioning of radio receiving equipment and the like.

It is a still further object of the invention to provide a method and means of reducing to a predetermined minimum the high frequency electrical interference normally produced by a series motor and its associated current-interrupting speed responsive control means.

It is also an object of the invention to provide a shielding enclosure operable to reduce to a predetermined minimum the radiation interference voltage produced by an electrical power unit and its associated current-interrupting control means, which shielding enclosure includes a nonradiating power line filter operable at all times to substantially prevent the transmission of interference voltage away from the shielding enclosure by electrical conduction.

Further objects are to provide a construction of maximum simplicity, economy and ease of assembly and disassembly, also such further objects, advantages and capabilities as will fully appear and as are inherently possessed by the device and the invention described herein.

The invention further resides in the combination, construction, and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof, or the scope of the appended claims.

Referring to the drawings.

Referring now more particularly to the drawings, in which like numerals indicate like parts in the several views, there is shown generally at 20 a self-contained electrical power unit, of the same general type as disclosed in Patent No. 2,456,980 to Moody, wherein all elements thereof (motor, terminal block, condenser, resistor, switching means, and the necessary wiring to complete a circuit) are mounted on a single small plate which may readily be installed in a calculating machine or similar device in operative relation therewith, or easily removed therefrom for inspection, repair, or replacement without substantial disassembly or the necessity of disturbing the relative position of the component parts which comprise the self-contained electrical power unit 20. Thus, if any portion of the electrical circuit of the present invention needs repair or replacement, it would be necessary only to unscrew the mounting screws attaching the electrical power unit to the frame of the machine, and withdraw the complete electrical unit therefrom.

Figure 1:
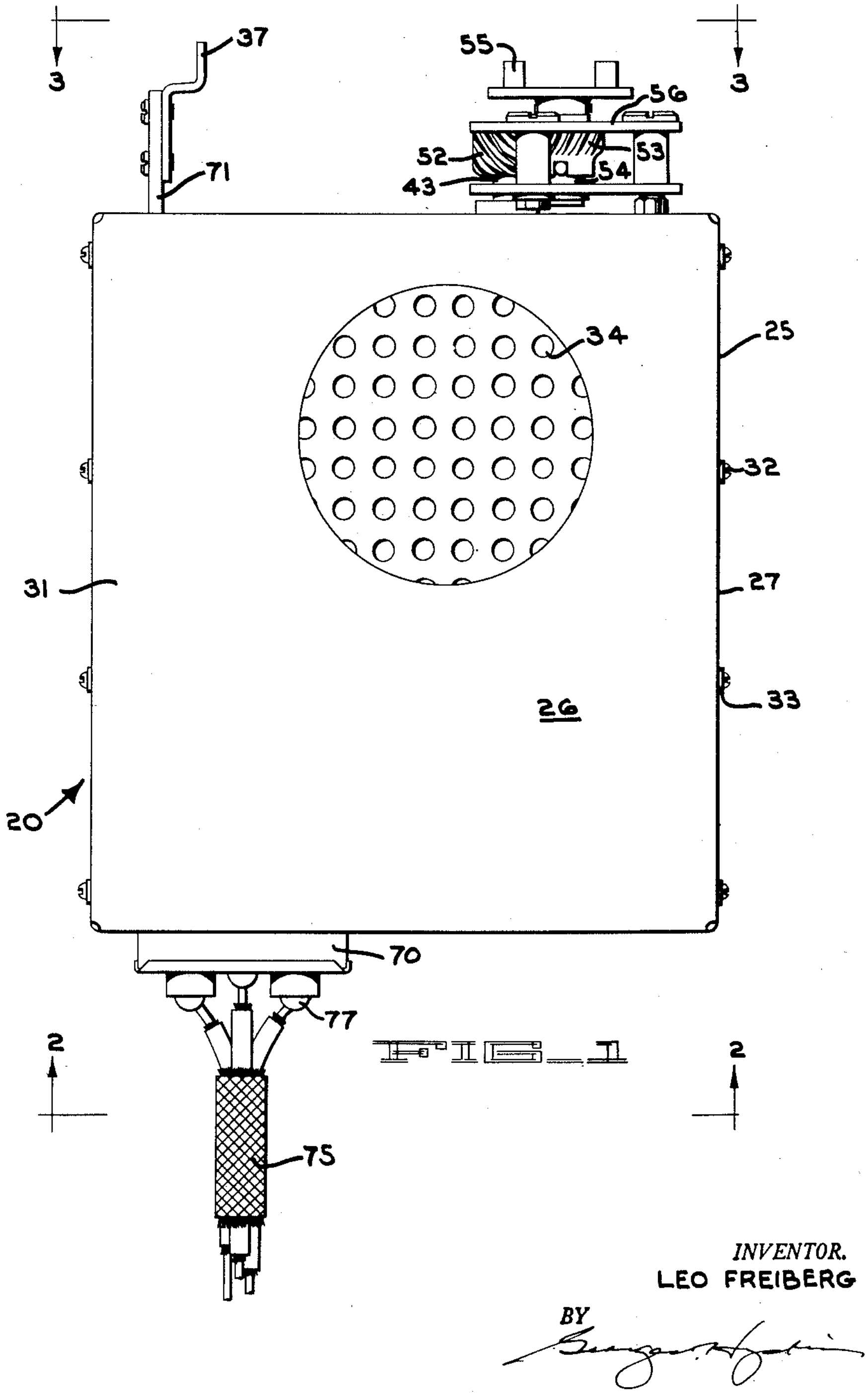
Fig. 1 is a plan view of the complete electrical interference eliminator showing the shielding cover installed thereon.
Figure 2:
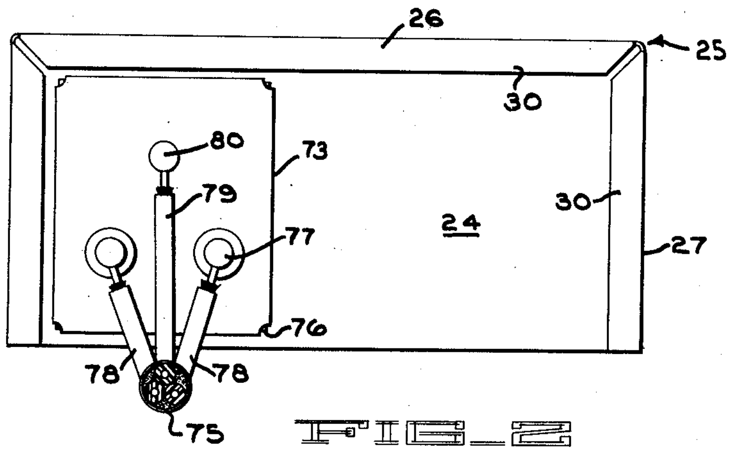
Fig. 2 is an end elevational view taken along the line 2—2 in Fig. 1 showing the power line terminals of the device.
Figure 3:
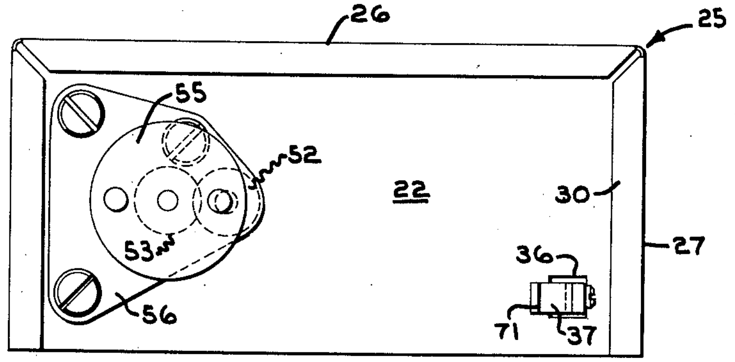
Fig. 3 is an end elevational view taken along the line 3—3 in Fig. 1 and shows the gear-driven power output shaft.
Figure 4:
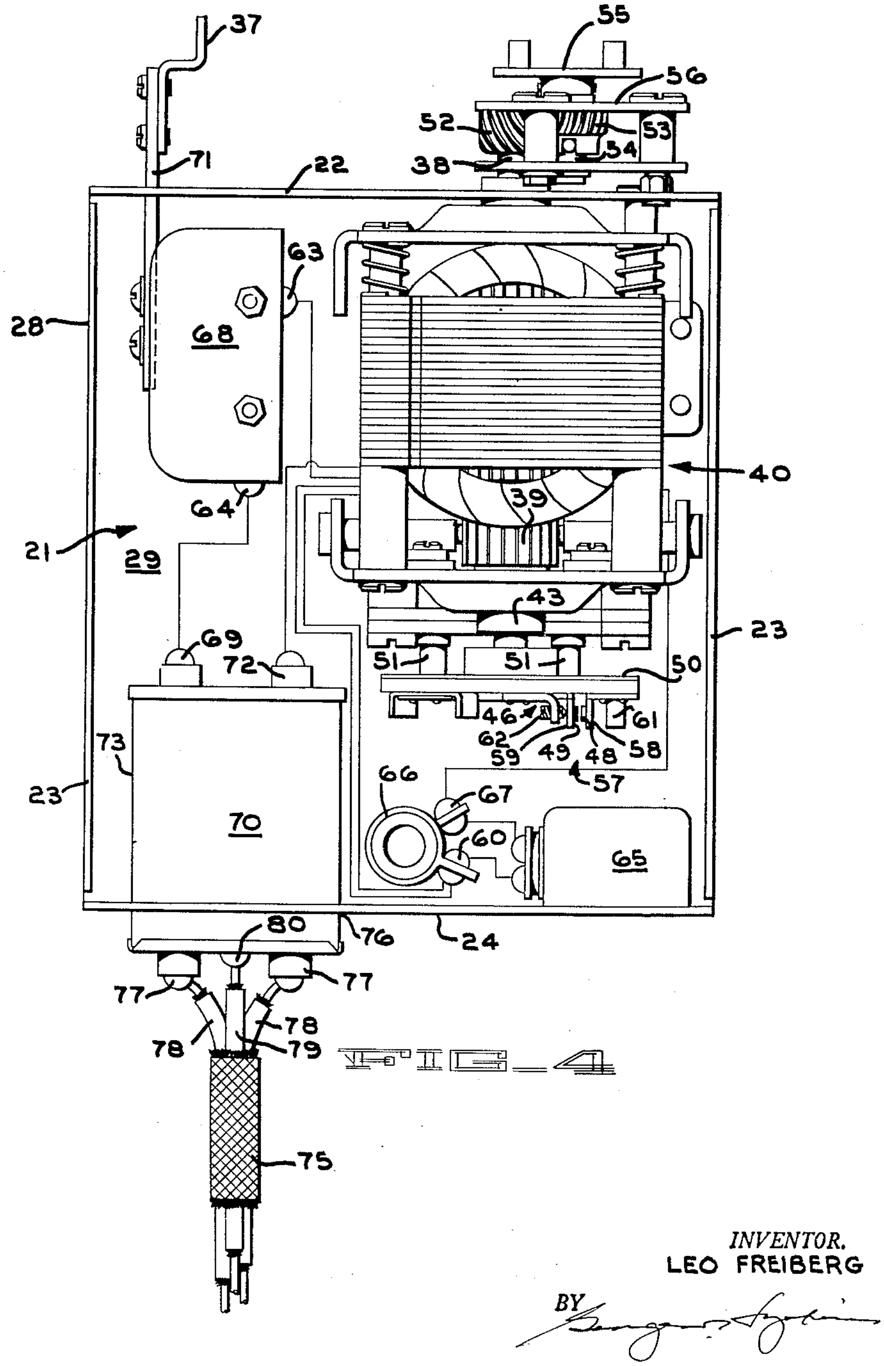
Fig. 4 is a plan view of the device of Fig. 1 with the shielding cover removed.

Referring now to Fig. 4, there is shown an inverted channel-shaped frame 21 of copperplated metal or other material possessing high electrical conductivity, which frame has a bed 29 and upwardly extending rectangular end portions 22 and 24 of sufficient height to extend slightly above the tallest component of the electrical power unit 20. Side portions 23 of the frame 21 are also flanged upwardly in the same direction as the end portions 22, but extend only a relatively short distance above the plane of the bed 29 of the frame so as to provide convenient access to the individual components which comprise the power unit 20.

A channel-shaped shield or cover 25 is also provided and has a top 26 and a pair of downwardly extending sides 27, the depth of which is substantially equal to that of the end portions 22 and 24, and the interior surfaces of which are spaced apart a distance substantially equal to the distance between the exterior surfaces 28 of the side portions 23 of the frame 21. The cover 25 is also copperplated or otherwise formed of metal having a high electrical conductivity, and preferably has overlapping flanges 30 extending inwardly from the respective top and side portions 26 and 27 thereof so as to circumscribe the outer extremities of the members 22 and 24 whenever the shield or cover 25 is moved into engagement with the peripheral edges thereof by vertically lowering the cover 25 into place.

Each of the side members 23 of the frame 21 preferably has a plurality of suitably spaced screws 32 extending inwardly into similarly tapped holes therein so that no nut is required to retain the screws 32 in place. Each screw 32 preferably carries a washer 33 of metal or other conductive material. The cover is provided with coacting vertical slots, not shown, formed in the sides 27 of the cover 25 and extending upwardly from the lower extremity thereof. These slots may be moved into sliding engagement with the screws 32 so as to removably retain the cover 25 in place to form a shielding enclosure 31 and to establish a good electrical connection between the frame 21 and cover 25 whenever the screws 32 are tightened. It will be apparent that other means of removably securing the cover 25 to the frame 21 so as to form the shielding enclosure 31 may be employed without departing from the spirit or scope of the present invention.

Since the motor, resistors, and other electrical components mounted on the frame 21 dissipate considerable heat during use, it is desirable to make provision for ventilating the enclosure 31 in a manner which will not substantially interfere with the efficiency of the arrangement for eliminating electrical interference produced by the power unit 20. Suitable ventilating holes 34 may be formed in a predetermined portion or portions of the cover 25, or if desired the entire cover may be perforated with small geometrically spaced ventilating holes.

Figure 5:
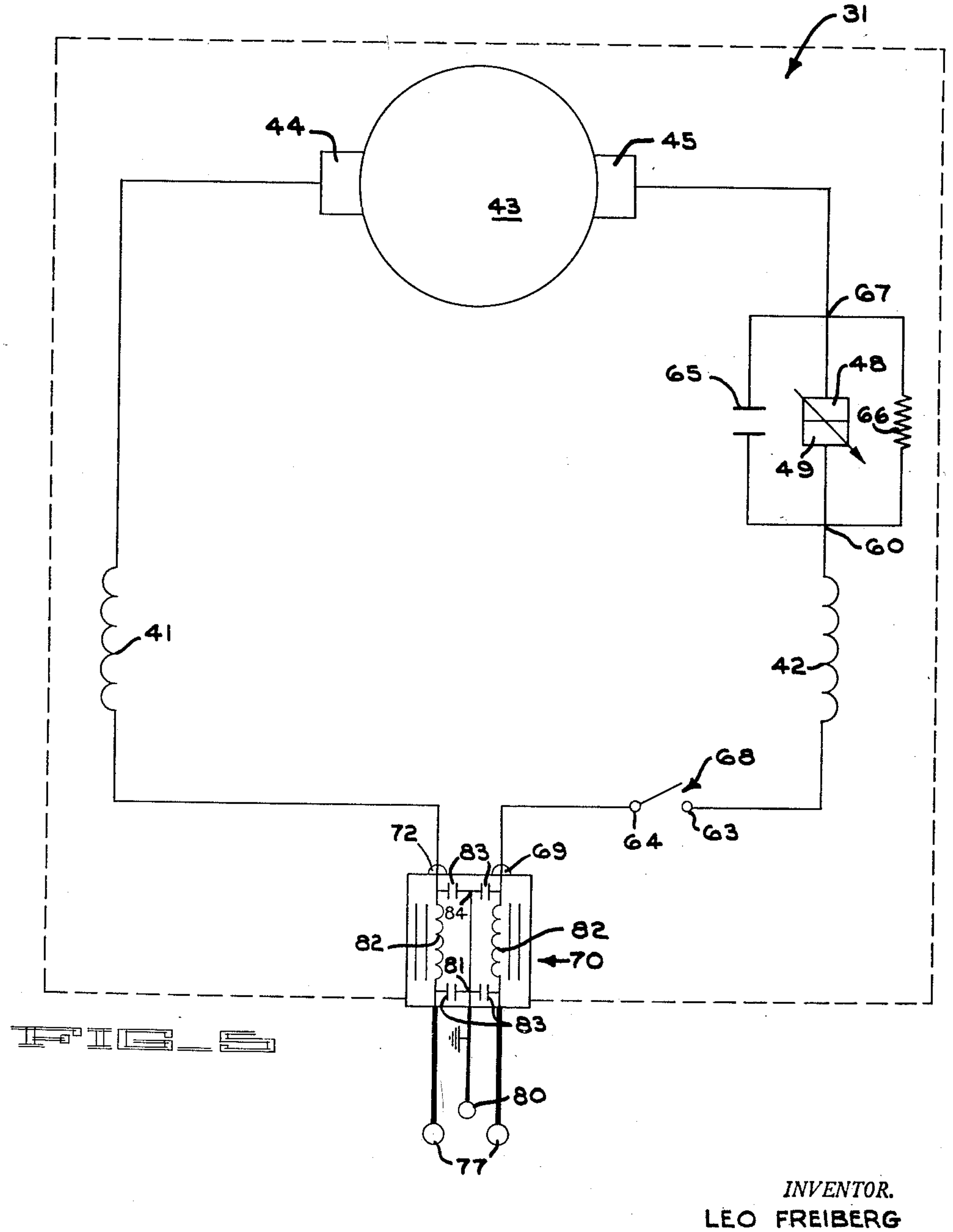
Fig. 5 is a schematic electrical diagram of the device illustrated in Fig. 4.

As is best shown in Figs. 4 and 5, 40 indicates an electrical motor of suitable size and shape secured to the frame 21 by suitable attaching means and having field coils 41 and 42, and an armature 43 having a commutator 39 adapted to be supplied with current by the brushes 44 and 45. Preferably, motor 40 is of a series wound type possessing relatively high starting torque characteristics, and the armature 43 thereof drives a speed governor 46 of known design having normally closed contacts 48 and 49 thereon which are supplied with electrical potential by insulated slip rings on the cylinder disc 50 which coact with suitably insulated brushes 51 extending outwardly from the commutator end of motor 40. In instances wherein the starting and operating characteristics of a series motor are neither necessary nor desirable, a shunt or compound wound motor may sometimes be utilized, in which case it may be possible to eliminate the motor speed limiting means. Whenever the series motor is used, however, a governor 46 or equivalent means of limiting the speed of armature 43 under no load conditions is generally required.

The opposite end of the armature 43 carries a shaft 38 which extends outwardly through a suitable hole in the frame end 22 and rotates a gear 52 which meshes with a gear 53 adapted to drive a short shaft 54 having a quick-disconnect output coupling 55 at its outer end. Shaft 54 is journalled in the two parallel plates 56, which are secured to and project outwardly beyond frame end 22, the gears 52 and 53 being required to laterally displace the shaft 54 away from the axis of the armature 43 a sufficient distance to avoid interference with adjacent parts.

The contacts 48 and 49 are affixed to and carried by the respective leaf spring members 58 and 59 which normally retain the contacts in the closed position and in current-carrying engagement with each other. Whenever the speed of armature 43 exceeds a predetermined value, however, the magnitude of the centrifugal force acting on the spring member 58 is sufficient to overcome the resilient spring action normally holding the contacts 48 and 49 in the closed position, and the centrifugal switch 57 which is carried by the governor 46 moves to the open position until such time as the armature speed of the motor decreases sufficiently to permit the resilient action of the spring members 58 and 59 to again return the respective contacts 48 and 49 to the normally closed position. Outward movement of the member 58 when the switch 57 is in the open position is limited by a positive stop 61, and adjustment of the particular speed at which the centrifugal switch 57 is set to open is made by turning the set screw 62.

Connected electrically in parallel with the contacts 48 and 49 of the switch 57 is a condenser 65 having a value adapted to minimize sparking as the switch contacts move from the closed to the open position. Also connected in parallel with the switch contacts 48 and 49 is a resistor 66 which is adapted to lower the voltage applied to the armature brushes 44 and 45 sufficiently to cause the series motor 50 to slow down to a speed below the operative speed of the centrifugal switch 57, whenever the contacts 48 and 49 are in the open position.

Referring now to Fig. 5, it will be seen that whenever the switch 57 is open condenser 65 and resistor 66 form a parallel circuit network having an upper terminal 67 which is connected to the armature brush 45 and a lower terminal 60 which is connected to one end of the motor field coil 42. When switch 57 is closed, current flows from terminal 60 to the terminal 67 through the switch contacts 48 and 49. The other end of field coil 42 is connected to one terminal 63 of a single pole single throw micro-switch 68 having its other terminal 64 connected to output terminal 69 on the power line filter 70. Micro-switch 68 is secured to the frame bed 29 by suitable attaching means, and preferably is contained within the shielded enclosure 31 whenever the cover 25 is in place. Switch 68 is operable independently of the centrifugal switch 57, and preferably is operated by an actuator arm 71 which extends through a small rectangular aperture 36 in the frame end 22. Whenever the switch 68 is in its normally open position, the actuator bar 71 is moved to the left as viewed in Fig. 4, and switch 68 is closed by pushing outer extremity 37 of the actuator arm 71 to the right by suitable means, not shown. Motor field coil 41 has one end connected to the armature brush 44 and has its other end connected to output terminal 72 on the line filter 70. Thus, it will be seen that field coil 41, motor armature 43, switch terminals 60 and 67, field coil 42, and micro-switch 68 are connected electrically in series and that these circuit components and all interconnecting wiring are wholly contained within the shielded enclosure 31 when the cover 25 is installed in place on the frame member 21. In this manner, radiation of electrical interference produced by the motor commutator 39 and centrifugal switch contacts 48 and 49 is either substantially eliminated or reduced to such a low value as to have no adverse effect on the normal functioning of radio receiving equipment, radar, television facsimile equipment, and the like.

Means is also provided for substantially eliminating the transfer of electrical interference generated within the shielded enclosure 31 to the associated power line cord 75 by conduction, and for otherwise preventing electrical interference generated within the enclosure 31 from leaking past the grounded shield enclosure and appearing externally thereof as conducted interference. Line filter 70 is partially contained within the enclosure 31 with its base resting on the bed 29 of the frame member 21 and with the line terminals 77 thereof extending laterally outwardly through the rectangular aperture 76 cut in frame end 24. Thus, the filter output terminals 69 and 72 are electrically isolated from the line input terminals 77 which protrude beyond the enclosure 31, and unit 70 may be secured to the end member 24 by any suitable means adapted to establish a good electrical connection with the filter case 73, such as brazing or soldering the sides of the metallic container 73 thereof to the coacting edges of the aperture 76. Power line cord 75 contains two insulated conductors 78 which externally communicate the filter input terminals 77 with a suitable source of electrical potential which preferably is of the alternating type, and cord 75 also contains a third conductor 79 having one end connected to ground and its other end connected to the shield enclosure 31 through frame end 24, the metallic case 73 which contains line filter 70, and the ground terminal 80 thereof.

Line filter 70 preferably is of the band elimination type, and has an iron core reactance element 82 connected between each input terminal 77 and the respective output terminals 69 and 72 thereof. A pair of series capacitors 83 are connected between the input terminals 77 thereof, and also between the filter output terminals 69 and 72. The junction 84 between the output capacitors 83 and corresponding junction 81 between the input capacitors 83 are also connected together and to ground potential at the external terminal 80. The values of the capacitors 83 and reactances 82 are selected so as to substantially eliminate the conduction to the power line 75 of interference voltages falling within a predetermined frequency range such as 150 kc. to 400 mc. normally utilized by radio receiving sets and other types of communication equipment which may be operated in close proximity to power unit 20.

Although a double pi-section line filter 70 has been shown in the preferred form of the instant invention, it will be realized that other forms of band elimination filters may be utilized without departing from the spirit or scope of the instant invention. It should be noted that the field coils 41 and 42 in the preferred form of the invention also function as high frequency choke coils which further impede the transmission of electrical interference by conduction away from the shielded enclosure 31 in which such interference may be generated.

From the foregoing it will be seen that there has been produced an effective and highly efficient line filter and electrostatic and electromagnetic shielding enclosure for an electrical power unit which substantially eliminates radiated electrical interference by preventing the shield itself from becoming a radiator as a result of circulating high frequency currents produced by various ground points within the electrical system. It will also be apparent that there has been provided a power line filter which coacts with the electrostatic and electromagnetic shielding enclosure in such a manner that the filter itself is protected from the effect of radiated interference so as to substantially prevent an interference voltage generated within the shielding enclosure from leaking through the shield and travelling back along the power line as conducted interference. Thus, provisions have been made for eliminating both conducted and radiated electrical interference to such an extent that communications equipment and other highly sensitive electrical devices may, without substantial impairment in the normal functioning thereof, be operated in close proximity to a motor-driven electrical power unit constructed and operated in accordance with the instant invention.

I claim:

1. In a machine adapted to be driven by a commutator type motor contained within a shielding enclosure, the combination which comprises a metallic supporting base, a removable cover for the said base composed of electrically conductive material, means for securing the said cover to the said base, and a self-contained band elimination filter partially disposed within the said enclosure and coacting with the shield thereof to substantially prevent electrical interference generated within the said enclosure from being conducted or radiated externally thereof.

2. In a machine adapted to be driven by a commutator type motor contained within a shielding enclosure, the combination which comprises a metallic supporting base, a removable cover for the said base composed of an electrically conductive material, means for securing the said cover to the said base in such a manner as to form a shielding enclosure adapted to substantially prevent radiated interference from escaping from the said enclosure, and a self-contained band elimination filter supported by the said base and having output terminals disposed interiorly within the said enclosure and input terminals disposed externally thereof, the said filter being adapted to prevent electrical interference generated within the said enclosure from being reradiated by the electrical components of the said filter or conducted to the said line cord.

3. In a machine adapted to be driven by a series motor contained within a shielding enclosure, the combination which comprises a metallic supporting base, a removable cover for the said base composed of electrically conductive material, means for removably securing the said cover to the said base in such a manner as to form a shielding enclosure adapted to substantially prevent interference voltage from being radiated externally thereof, a centrifugal switch driven by the said motor within the said enclosure and having contacts thereon adapted to reduce the voltage applied to the armature of the said motor whenever the speed thereof exceeds a predetermined maximum, and a self-contained and separately shielded band elimination filter extending through the said base and having output terminals thereon disposed interiorly within the said enclosure and having input terminals extending externally thereof, the said filter being adapted to prevent interference voltage generated within the said enclosure from being radiated or conducted externally thereof.

4. In a machine adapted to be driven by a series motor substantially contained in a shielding enclosure, the combination which comprises a metallic supporting base, a removable cover for the said base composed of electrically conductive material and having ventilating perforations in at least a portion thereof, means for removably securing the said cover to the said base in such a manner as to form a primary shielding enclosure adapted to substantially prevent electrical interference from being radiated externally thereof, a centrifugal switch driven by the said motor within the said primary enclosure and having contacts thereon operable to reduce the speed of the said motor whenever the speed thereof exceeds a predetermined maximum, and a power line filter completely enclosed in a secondary shielding enclosure substantially contained within the said primary shielding enclosure, the said filter having externally disposed input terminals and having output terminals thereon disposed interiorly within the said primary enclosure, whereby the said filter coacts with the said primary enclosure to substantially prevent electrical interference generated within the said enclosure from being radiated externally or conducted to the power line.

5. In a machine adapted to be driven by a commutator-type motor substantially contained within a shielding enclosure, the combination which comprises a metallic supporting base, a removable cover for the said base composed of electrically conductive material, means for removably securing the said cover to the said base in such a manner as to establish a good electrical connection and to form therewith the said shielding enclosure, switching means within the said enclosure independently operable externally of the said enclosure for controlling the flow of current to the said motor, and a self-contained and separately shielded power line filter extending through and secured to the said base with its output terminals disposed interiorly within the said enclosure and with its input terminals disposed externally thereof, the said filter being adapted to coact with the shield for the said enclosure in such a manner as to substantially prevent electrical interference generated within the said enclosure from being radiated or conducted externally thereof.

6. In a machine adapted to be intermittently driven by a series motor substantially contained within a shielding enclosure, the combination which comprises a metallic supporting base having side portions extending upwardly therefrom, a removable cover for the said base composed of electrically conductive material and having ventilating perforations in at least a portion thereof, means for removably securing the said cover to the said base for establishing a good electrical connection and forming therewith the said shielding enclosure, a governor driven by the said motor within the said enclosure and having electrical contacts thereon adapted to reduce the voltage applied to the armature of the motor whenever the speed thereof exceeds a predetermined maximum, switching means within the said enclosure independently operable externally thereof for controlling the flow of current to the said motor, and a self-contained and independently shielded band elimination filter having output terminals within the said enclosure and input terminals disposed externally thereof, the said filter being adapted to coact with the shield for the said enclosure in such a manner as to substantially prevent electrical interference voltage generated within the said enclosure from being conducted or radiated externally thereof.

LEO FREIBERG.

REFERENCES CITED

The following references are of record in the file of this patent:

UNITED STATES PATENTS

| Number | Name | Date |
|---|---|---|
| 1,645,643 | Crook | Oct. 18, 1927 |
| 1,843,525 | Thomas | Feb. 2, 1932 |
| 2,157,430 | Partz | May 9, 1939 |
| 2,184,344 | Hemphill | Dec. 26, 1939 |

FOREIGN PATENTS

| Number | Country | Date |
|---|---|---|
| 401,782 | Great Britain | June 14, 1932 |
| 215,207 | Switzerland | Sept. 1, 1941 |